United States Patent [19]
Lee

[11] Patent Number: 5,995,707
[45] Date of Patent: Nov. 30, 1999

[54] SPEED CHANGE REPRODUCTION RECORDING APPARATUS FOR VCR OF DIGITAL HDTV AND METHOD THEREOF

[75] Inventor: Je-Hyoung Lee, Seoul, Rep. of Korea

[73] Assignee: LG Electronics Inc., Seoul, Rep. of Korea

[21] Appl. No.: 08/931,239

[22] Filed: Sep. 16, 1997

Related U.S. Application Data

[63] Continuation of application No. 08/562,519, Nov. 24, 1995, abandoned.

[30] Foreign Application Priority Data

Nov. 26, 1994 [KR] Rep. of Korea ....................... 94-31372

[51] Int. Cl.$^6$ ...................................................... H04N 5/76
[52] U.S. Cl. ........................... 386/81; 386/124; 386/111; 386/68
[58] Field of Search ................................... 386/6, 14, 33, 386/37, 46, 49, 68, 50, 52, 81, 109, 110, 111, 112, 124, 126; H04N 5/76

[56] References Cited

U.S. PATENT DOCUMENTS

| | | | |
|---|---|---|---|
| 5,377,051 | 12/1994 | Lane et al. | 386/124 |
| 5,461,486 | 10/1995 | Uchida | 386/112 |
| 5,535,008 | 7/1996 | Yamagishi et al. | 386/109 |
| 5,557,418 | 9/1996 | Schaefer | 386/126 |

*Primary Examiner*—Brian L. Casler
*Assistant Examiner*—Luannl P. Din

[57] ABSTRACT

An improved speed change reproduction recording apparatus for a VCR of an HDTV and a method thereof capable of achieving a better resolution during a speed change reproduction operation which includes a normal reproduction bit stream processing unit for converting an HDTV bit stream into a VCR recording format and for outputting a normal reproduction bit stream; a system decoder for separating a video bit stream from a transmission layer of the HDTV bit stream; a video stream processing unit for extracting a speed change reproduction data from a video bit stream separated by the system decoder and for converting the thusly extracted speed change reproduction data into a format of a video syntax; a system encoder for reformatting a speed change reproduction data outputted from the video bit stream processing unit into a transport packet which is a transmission standard in accordance with a header information outputted from the system decoder; a recording format processing unit for converting a speed change reproduction data outputted from the system encoder to a VCR recording format and for storing the thusly converted into a corresponding frame buffer, and a track recording format unit for selecting a normal reproduction data outputted from the normal reproduction bit stream processing unit and a speed change reproduction data outputted from the recording format processing unit in accordance with a proper timing.

21 Claims, 16 Drawing Sheets

| EVOLUTION(RPM) | HEAD | RECORDING RATE (Mbps) | TRACK/ FRAME | SYNCBLOCK/ TRACK |
|---|---|---|---|---|
| 1800 | 4-HEAD | 30.8 | 4 | 352 |

A, A' : SAME AZIMUTH HEAD

B, B' : SAME AZIMUTH HEAD

| SPEED | REPRODUCING SYNCBLOCK NUMBER |
|---|---|
| X2 | 88 |
| X3 | 44 |
| X4 | 29.33 |
| X5 | 22 |
| X6 | 17.6 |
| X7 | 14.67 |
| X8 | 12.57 |
| X9 | 11 |

| X2 | X4 | X6 |
|---|---|---|
| 1 – 89 | 1 – 29 | 1 – 17 |
|  | 89 – 146 | 53 – 88 |
|  |  | 124 – 158 |
|  | 206 – 263 | 194 – 288 |
|  |  | 264 – 299 |
| 265 – 352 | 323 – 352 | 333 – 352 |

| PICTURE CODE TYPE | CODING METHOD |
|---|---|
| 0 0 0 | PROHIBITED BIT |
| 0 0 1 | INTRAFRAME CODING |
| 0 1 0 | INTERFRAME CODING |
| 0 1 1 | BIDIRECTIONAL INTERFRAME CODING |
| 1 0 0 ~ 1 1 1 | PRESERVED BIT |

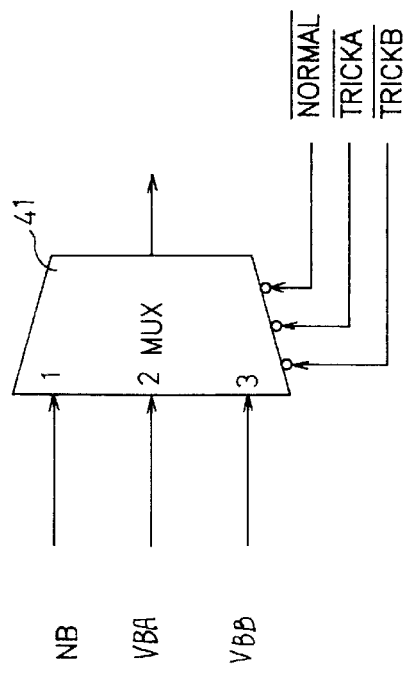
FIG. 19
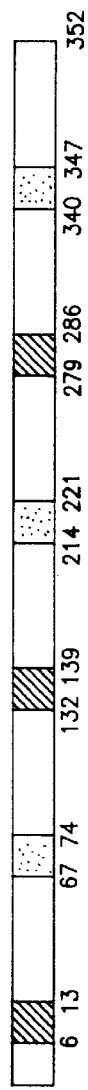
FIG.20A
FIG.20B $\overline{HSP}$
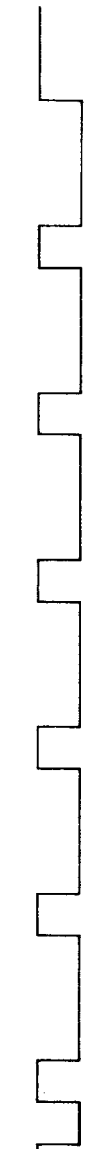
FIG.20C $\overline{NORMAL}$
FIG.20D $\overline{TRICKA}$
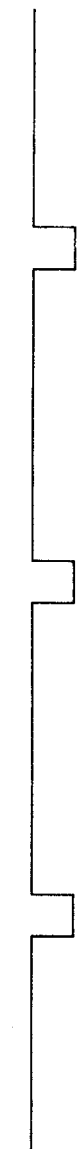
FIG.20E $\overline{TRICKB}$

SPEED CHANGE REPRODUCTION RECORDING APPARATUS FOR VCR OF DIGITAL HDTV AND METHOD THEREOF

This application is a continuation, of application Ser. No. 08/562,519 filed on Nov. 24, 1995, now abandoned.

BACKGROUND OF THE INVENTION

1. Field of the Invention

The present invention relates to a speed change reproduction recording apparatus for a video cassette tape recorder (hereinafter called a "VCR") of a digital high definition television (hereinafter called an "HDTV") and a method thereof capable of achieving a better resolution of picture during a speed change reproduction operation by separating a normal reproduction data and a speed change reproduction data from a digital HDTV signal, storing the thusly separated speed change reproduction data into a plurality of frame buffers, and alternately recording the speed change reproduction data outputted from the frame buffers on a corresponding track.

2. Description of the Conventional Art

Generally, the method of the digital VCR is classified into a method of compressing, recording, and reproducing the analog signal transmitted thereto using a decoder, and a method of recording and reproducing the analog signal without compressing the signal.

The digital type HDTV such as a U.S. Grand Alliance type is characterized to adopting the later method. In this case, a certain interface circuit is necessary instead of a decoder, and there is no distortion, so that a desired resolution can be achieved. However, in case of the transport recording method, a picture resolution decrease takes place during a forward/backward reproduction mode, that is, during a speed change reproduction, which is one of major functions of VCR.

In order to resolve the above-mentioned problems, a certain method of recording a bit stream of an HDTV signal in a transparent method in a digital VCR, was necessary, since a data rate for recording the bit stream transmitted thereto, is smaller than the record rate which denotes that a data can be recorded on a tape, a method of executing a speed change by recording a speed change reproduction data on a tape region by as much as difference was introduced in the industry.

That is, this method is directed to extracting a speed change bit stream from an HDTV bit stream inputted therein, recording the thusly extracted stream on a speed change reproduction region, and implementing a desired speed change picture during a speed change reproduction mode. Therefore, a recording track includes a normal reproduction region (hereinafter called a "normal region"), which is characterized in directly recording a recording track as a bit stream and a speed change region (hereinafter called a "trick region") which is characterized in recording a speed change reproduction bit stream extracted.

In a general azimuth recording method, since the tape in a normal reproduction mode runs at the same speed as in a recording mode, the head, as shown in FIG. 1A, runs along a track of tape, and a trace of the head is formed along the track. However, the head in a speed change reproduction mode in which the running speed of the tape is different from the recording mode, as shown in FIG. 1B, runs across the tracks, and the trace crossing the tracks is executed.

Therefore, a partial data is extracted from each track of the same azimuth in a speed change reproduction mode for a reproduction. In addition, since an HDTV bit stream is a compressed data type, only an intraframe coding bit stream can be decoded independently. Therefore, the data reproduced in a speed change reproduction mode in a VCR, in which an HDTV bit stream is recorded in order, includes a burst characteristic. That is, only a partial part of each track is reproduced. The speed change picture includes a bit stream of the intraframe. Therefore, a reproducing speed change picture has a disadvantage in that a partial picture is reproduced in a mosaic format.

Referring to FIG. 2, a conventional speed change reproduction recording apparatus for a VCR of a digital HDTV includes a syncblock unit 1 for receiving an HDTV bit stream having a video data and an audio data and for converting the thusly received data into a syncblock format which is a basic unit of a VCR record and reproduction, a buffer 2 for temporarily storing the syncblock outputted from the syncblock unit 1, a transport decoder 3 for decoding the HDTV bit stream and for separating a video bit stream from the HDTV bit stream, a video header decoder 4 for separating a bit stream coded for an intraframe from the video bit stream outputted from the transport decoder 3, a variable length decoder 5 for executing a variable length decoding operation so as to recognize a codeword contained in the bit stream separated by the video header decoder 5, a speed change data extractor 6 for separating a direct current voltage component and a low frequency component from a codeword outputted from the video header decoder 5, a transport encoder 7 for packeting a speed change reproduction video bit stream outputted from the speed change data extractor 6 to have the same format as the normal reproduction bit stream, a syncblock unit 8 for converting the bit stream outputted from the transport encoder 7 into a syncblock format, a buffer for temporarily storing the syncblock outputted from the syncblock unit 8, a track record format unit 10 for providing a record timing corresponding to each record format, and a multiplexer 11 for outputting a normal bit stream of the buffer 2 or a speed change reproduction bit stream of the buffer 9 to an error correction coding unit (not shown) in accordance with a record timing outputted from the track record format unit 10.

The operation of a conventional digital VCR recording apparatus will now be explained with reference to accompanying drawings.

To begin with, as shown in FIG. 3, the HDTV bit stream is transmitted to the syncblock unit 1, and the HDTV bit stream is converted into a syncblock format which is a basic unit of a VCR record and reproduction. Thereafter, the HDTV bit stream is stored in the buffer 2 and multiplexed by the multiplexer 11 with a speed change reproduction stream. In addition, the HDTV bit stream becomes a speed change bit stream through a transport encoder 3, a video header decoder 4, a variable length decoder 5, a speed change data extractor 6, a transport encoder 7, a syncblock unit 8, and the buffer 9, in order.

That is, in order to extract the speed change reproduction data, the transport decoder 3 separates a video bit stream by decoding the transport packet of the HDTV bit stream containing a video bit stream, an audio bit stream, and an extra data bit stream and outputs the thusly separated video bit stream to the video header decoder 4. The video header decoder 4 separates a decoding intraframe bit stream from the video bit stream and outputs to the variable length decoder 5.

Since the HDTV bit stream is variable-length-decoded so as to obtain a desired high compression rate, the variable length decoding is executed so that each codeword of bit streams can be recognized. Thereafter, the speed change data extractor 6 separates a direct current voltage and a low frequency component from the codeword contained in the intraframe. That is, since the tape region corresponding to the speed change reproduction region is limited to its size, it is necessary to extract a bigger component which plays a more important role in achieving a desired speed change picture; however, the resolution of the speed change picture decreases compared with the normal reproduction.

The transport encoder 7 changes the speed change reproduction video bit stream to a bit stream corresponding to a syntax of the HDTV bit stream, and changes to a normal reproduction bit stream by transport-packeting it, and the syncblock 8 changes the bit stream to the syncblock and outputs to the buffer 9.

The thusly obtained normal reproduction bit stream and the speed change reproduction bit stream are multiplexed by the multiplexer 11 in accordance with a record timing signal outputted from the track record format unit 10 and outputted to the error correction coding unit (not shown). Here, the record timing signal is a kind of a control signal corresponding to a record format of a normal reproduction bit stream and a speed change reproduction bit stream each recorded on the normal region and the trick region of the tape.

In case that a data is. recorded on the normal region or the trick region, the surface of the trick region is determined by a record rate of the VCR, and the position of the trick region on the track is determined by a speed change algorithm. These surface and position of the trick region are directly related to the quality of the speed change reproduction and affects a two-speed reproduction function and a head tracking unit.

The method of setting the above-mentioned trick region is classified into a trick play track method of separating a trick region along a head reproduction trace in accordance to a certain speed as shown in FIG. 4A and a method of doubly recording the same bit stream by a track unit by separating a beginning part, an intermediate part, and an ending part in each track irrespective of the certain speed.

Two or three speed change reproduction methods can be available in the conventional digital VCR, and FIGS. 4A and 4B show three speed, nine speed and twenty seven speed, respectively.

However, in the conventional speed change method, when recording the speed change data on a track, it is possible to achieve a desired speed change picture by tracking a certain position, and it disadvantageously requires a certain tracking algorithm such as a servo-control.

In addition, in case of the method of separating a trick region along a trace of the head in accordance with a certain speed, since a speed change reproduction data corresponding to each speed is positioned in accordance with a head-limited tracking start position, an additional tracking algorithm for a speed change is disadvantageously necessary since a certain speed data is reproduced after the head is positioned at the starting position corresponding to a certain speed. Moreover, since a certain recording position is given in accordance with a certain speed, a more complicated formatting algorithm and memory configurations are necessary.

In order to remove the conditions that a tracking start position should be positioned at a specific position, in case that decreasing the bit number per picture, allocating the start portion, the intermediate portion, and the end portion of each track irrespective of the speed type without considering the frame rate of the certain speed picture so as to double-recording the bit stream by one track unit in case of the previously defined maximum speed, it is necessary to record the data amount reproducible from a track in every track during a certain period. In addition, even though it is possible to obtain a speed change picture at a predetermined position, the better resolution cannot be achieved because the speed change reproduction data is ineffectively double-recorded on the allocated speed change region because the speed change reproduction data and because a certain resolution determined by the maximum speed type is continuously adopted at a low speed.

SUMMARY OF THE INVENTION

Accordingly, it is an object of the present invention to provide a speed change reproduction recording apparatus for a VCR of an HDTV and a method thereof, which overcome the problems encountered in a conventional speed change reproduction recording apparatus for a VCR of an HDTV.

It is another object of the present invention to provide an improved speed change reproduction recording apparatus for a VCR of an HDTV and a method thereof capable of achieving a better resolution during a speed change reproduction operation by separating a normal reproduction data and a speed change reproduction data from a digital HDTV signal, storing the thusly separated speed change data into a plurality of frame buffers, and alternately recording the speed change reproduction data outputted from the frame buffers on its corresponding tracks.

To achieve the above objects, there is provided a speed change reproduction recording apparatus for a VCR of an HDTV, which includes a normal reproduction bit stream processing unit for converting an HDTV bit stream into a VCR recording format and for outputting a normal reproduction bit stream; a system decoder for separating a video bit stream from a transmission layer of the HDTV bit stream; a video stream processing unit for extracting a speed change reproduction data from a video bit stream separated by the system decoder and for converting the thusly extracted speed change reproduction data into a format of a video syntax; a system encoder for reformatting a speed change reproduction data outputted from the video bit stream processing unit into a transport packet which is a transmission standard in accordance with a header information outputted from the system decoder; a recording format processing unit for converting a speed change reproduction data outputted from the system encoder to a VCR recording format and for storing the thusly converted into a corresponding frame buffer; and a track recording format unit for selecting a normal reproduction data outputted from the normal reproduction bit stream processing unit and a speed change reproduction data outputted from the recording format processing unit in accordance with a proper timing.

To achieve the above objects, there is provided a speed change reproduction recording method, which includes the steps of a first step which allocates an M-portion in which a certain data is always reproducible to a trick region when a speed change reproduction starts on a certain track in accordance with a maximum speed of a certain speed such as "×N" where N is 2, 4, 6 . . . N.; a second step which sets a minimum region of the trick region as a basic unit of a trick region to be allocated on one track; and a third step which double-records the thusly extracted speed change reproduction data on a trick region of M-region existing in one track.

To achieve the above objects, in accordance with another aspect of the present invention, there is provided a speed change reproduction recording method, which includes the steps of a first step which allocates an M-portion in which a certain data is always reproducible to a trick region when a speed change reproduction starts on a certain track in accordance with a maximum speed of a certain speed such as "xN" where N is 2, 4, 6 . . . N.; a second step which sets a minimum region of the trick region as a basic unit of a trick region to be allocated on one track; and a third step which alternately double-records a speed change reproduction data of an A-frame or a speed change reproduction data of a B-frame on one track wherein a speed change data of the A-frame and a speed change data of a B-frame are allocated to a trick region of M/2 region of an M-trick region.

BRIEF DESCRIPTION OF THE DRAWINGS

FIG. 19 is a view of a multiplexer of FIG. 5 according to the present invention.

FIG. 20A is a view of a pattern of a track-by 352 synchronous block of a multiplexing time of a multiplexer of FIG. 5 according to the present invention.

FIG. 20B is a wave form of a head switching pulse of a multiplexing time of a multiplexer of FIG. 5 according to the present invention.

FIG. 20C is a wave form of a normal signal of a multiplexing time of a multiplexer of FIG. 5 according to the present invention.

FIG. 20D is a wave form of a track "A" signal of a multiplexing time of a multiplexer of FIG. 5 according to the present invention.

FIG. 20E is a wave form of a track "B" signal of a multiplexing time of a multiplexer of FIG. 5 according to the present invention.

Further scope of applicability of the present invention will become more readily apparent from the detailed description given hereafter. However, it should be understood that the detailed description in specific examples, while indicating preferred embodiments of the invention, are given by way of illustration only, since various changes and modifications within the spirit in scope of the invention will become apparent to those skilled in the art from this detailed description.

DETAILED DESCRIPTION OF THE INVENTION

Figure 1A:
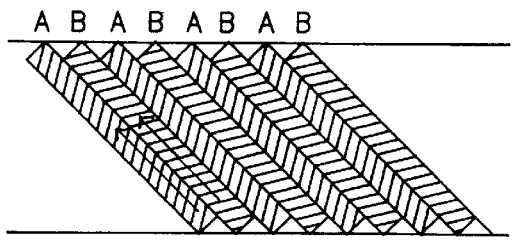
FIG. 1A is a view of a head tracing region in accordance with a normal reproduction mode of a conventional VCR.
Figure 1B:
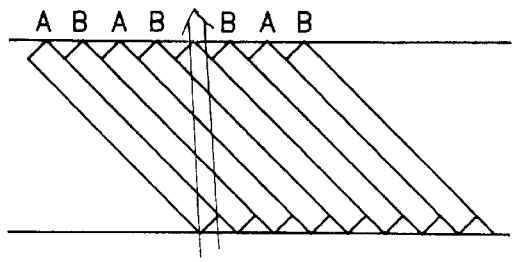
FIG. 1B is a view of a head tracing region in accordance with a speed change reproduction mode of a conventional VCR.
Figure 2:
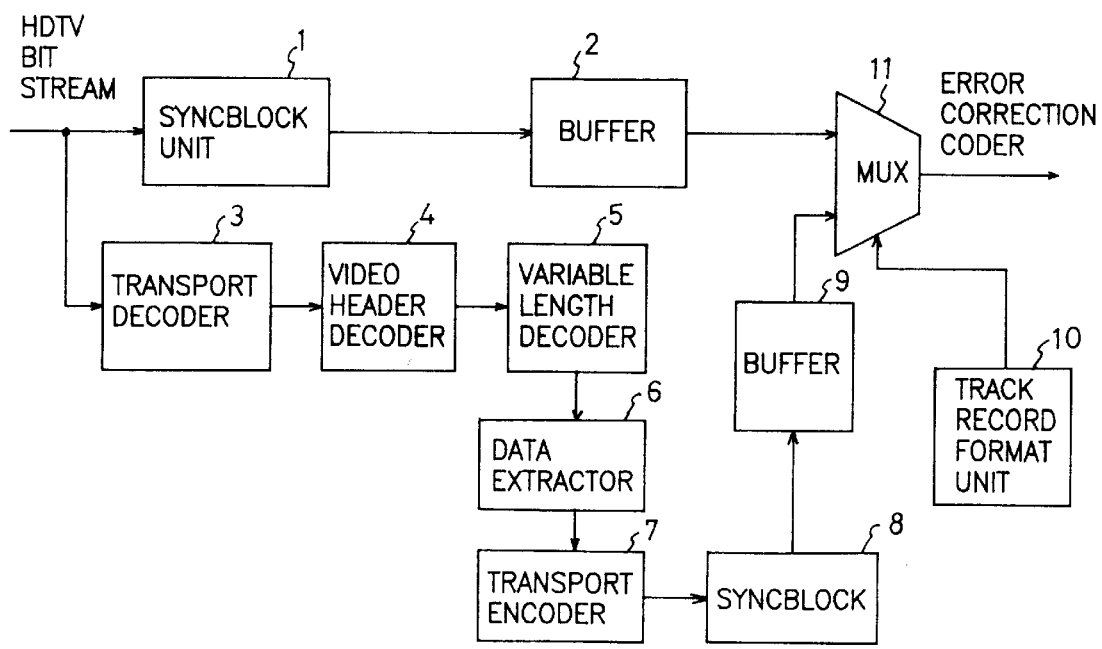
FIG. 2 is a block diagram of a recording apparatus for a conventional digital VCR.
Figure 3:
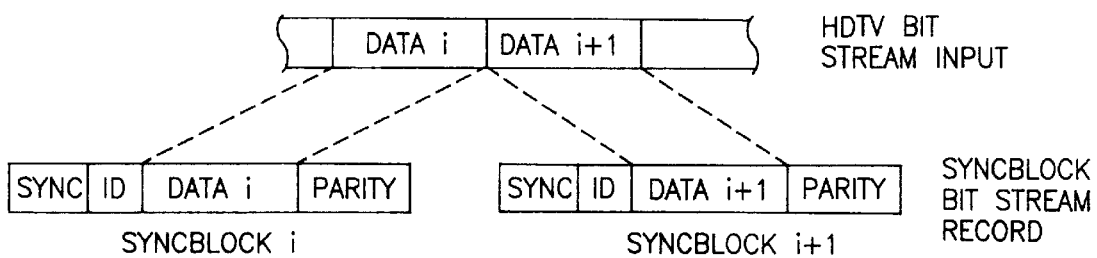
FIG. 3 is a view of a format of a synchronous block of a conventional digital VCR.
Figure 4A:
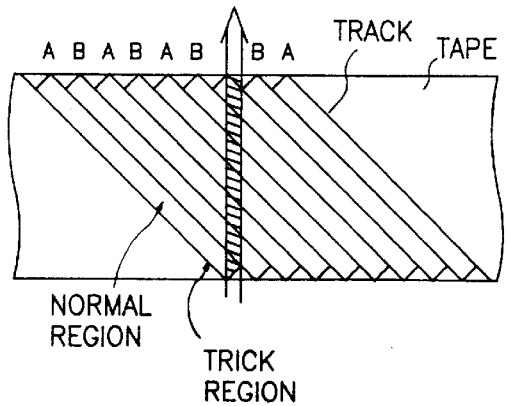
FIG. 4A is a view of a head tracing region in accordance with a trick play track of a conventional digital VCR.
Figure 4B:
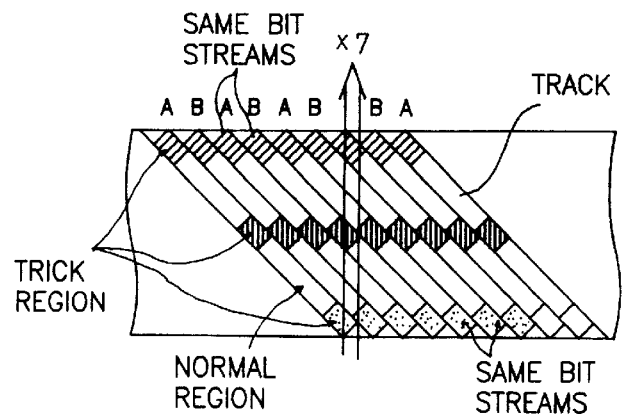
FIG. 4B is a view of a head tracing region in accordance with a double-recording method with respect to a bit stream of a conventional digital VCR.
Figure 5:
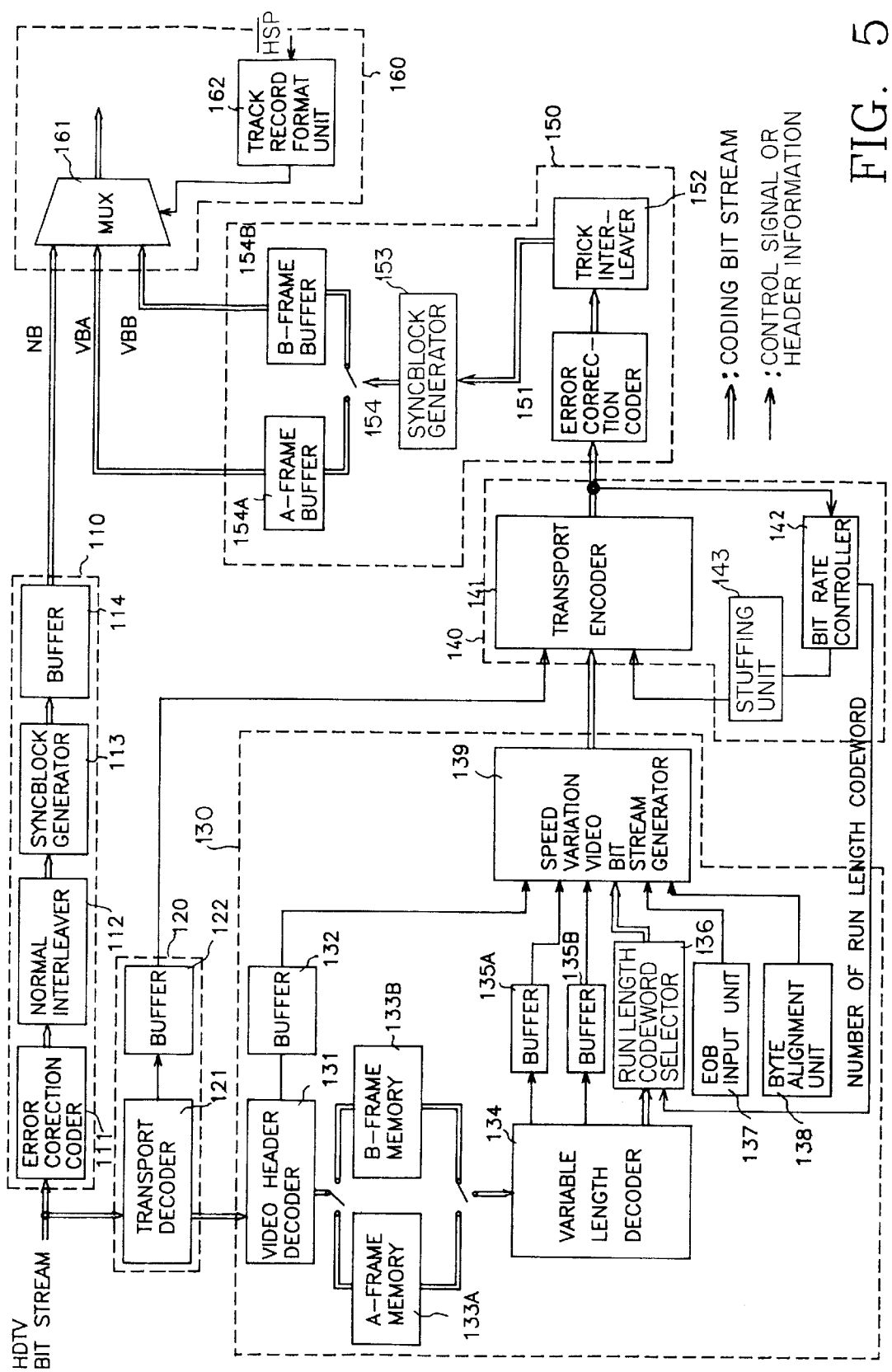
FIG. 5 is a block diagram of a recording apparatus of a speed change reproduction for a digital HDTV according to the present invention.

Referring to FIG. 5, a speed change reproduction recording apparatus for a VCR of a digital HDTV includes a normal reproduction bit stream processing unit 110 for converting an HDTV bit stream into a VCR recording format and for outputting a normal reproduction bit stream, a system decoder 120 for receiving an HDTV bit stream having a video, an audio and a value added data and for separating a video bit stream from a transmission layer of the HDTV bit stream, a video bit stream processing unit 130 for extracting a certain data of an intraframe bit stream of a speed change reproduction data from a video bit stream separated by the system decoder 120 and for converting the thusly extracted data into a syntax of the video bit stream, a system encoder 140 for reformatting the bit stream outputted from the video bit processing unit 130 into a transport packet of a transmission standard in accordance with a header information decoded by the system decoder 120, a recording format processing unit 150 for converting the speed change reproduction bit stream outputted from the system encoder 140 to a VCR recording format and for storing into a corresponding frame buffer, and a track record format unit 160 for selecting the normal reproduction bit stream NB outputted from the normal reproduction bit stream processing unit 110 and speed change reproduction bit streams VBA and VBB outputted from the recording format processing unit 150 in accordance with a certain timing.

The normal reproduction bit processing unit 110 includes an error correction coder for adding a redundancy bit for recovering an error which occurs in a recording and reproduction process to an HDTV bit stream, a normal interleaver 112 for executing an interleave for recovering a burst error which occurs due to a header/tape mechanism, a syncblock generator 113 for generating a syncblock by adding a synchronous signal SYNC and an identification signal ID to a bit stream outputted from the normal interleaver 112, and a buffer for temporarily storing the output data of the syncblock generator 113.

The system decoder 120 includes a transport decoder 121 for separating a video bit stream by recognizing a packet identification data of a link layer contained in the HDTV bit stream transmitted thereto in a packet format and for extracting a system header information such as a program specification information (PSI) and a picture elementary stream (PES) from the HDTV bit stream, and buffer for temporarily storing the header information outputted from the transport decoder 121.

The video bit stream processing unit 130 includes a video header decoder 131 for extracting an intraframe bit stream from the video bit stream outputted from the system decoder 120, a buffer 132 for temporarily storing a sequence or a group of picture (GOP), an A-frame memory 133A and a B-frame memory 133B for storing a bit stream of an intraframe outputted from the video header decoder 131, a variable length decoder 134 for decoding the bit stream outputted from the a-frame memory 133A or the B-frame memory 133B to a variable length format, a buffer 135A for storing a picture header information decoded by the variable length decoder 134, a buffer 135B for storing a slice header information decoded by the variable length decoder 134 and a coding information of a macroblock, a run length code selection unit 136 for selecting a certain speed change picture data from a codeword of each block contained in the bit stream decoded by the variable length decoder 134 in accordance with the number of the previously set run length codeword, an end of block (EOB) input unit 137 for adding an end of block, a byte alignment unit 138 for aligning each byte so that the speed change bit stream can have the same construction as the bit stream of the HDTV, and a speed change reproduction bit stream 139 for reformatting the bit stream outputted from the variable length codeword selection unit 136 to have a syntax of the bit stream of the HDTV using a header information stored in the buffers 132, 135A and 135B.

The system encoder 140 includes a bit rate controller 142 for having the number of the codeword so as to control the bit rate to be recorded, a stuffing unit 143f for stuffing the null packet in accordance with a control of the bit rate controller 142, and a transport encoder 141 for reformatting the bit stream outputted from the speed change reproduction bit stream generator 139 into a transport packet format using the headers PSI and PES stored in the buffer 120.

The recording format processing unit 150 includes an error correction coding unit 151 for inputting a redundancy bit for an error correction into the bit stream outputted from the transport encoder 141, a trick interleaver 152 for interleaving the output bit stream of the error correction coder 151, a syncblock generator 153 for converting the output bit stream of the trick interleaver 152 into the format of the syncblock, and an A-frame buffer and B-frame buffer 154A and 154B for storing a speed change picture by one frame transmitted from the syncblock generator 153.

The track recording format unit 160 includes a track recording format unit 162 for generating a certain timing so as to select a normal reproduction bit stream or a speed change reproduction bit stream with a reference of the head switching pulse, and a multiplexer 161 for selecting the normal reproduction bit stream outputted from the normal reproduction bit stream processing unit 110 or the bit stream outputted from the encoding format processing unit 150 in accordance with a control of the track recording format unit 162 and for outputting thusly selected bit stream to a modulator (not shown).

The operation of a speed change reproduction recording apparatus for a VCR of a digital HDTV will now be explained with reference to accompanying drawings.

To begin with, in a home type digital VCR capable of recording the HDTV bit stream in a transparent recording method, since there exists a big difference between the surface of the tape region necessary for recording data and the real surface on which data is really recorded, the present invention is directed to recording a speed change reproduction data corresponding to the above-mentioned difference on a corresponding region of the tape. For example, in case of the HDTV bit stream due to a grand alliance method (GA), the total rate is about 21.5 Mbps; however, of which the data to be really stored is about 19.3 Mbps.

Therefore, when the HDTV bit stream of a data rate 19.3 Mbps is converted into a VCR record format by adding a synchronous code, an identification code ID, and an error correction bit, since the data rate becomes about 26.2 Mbps, the speed change reproduction data is recorded on a trick region of the tape at a rate of about 4.6 Mbps to 30.8 Mbps.

Figures 6, 7, 9:
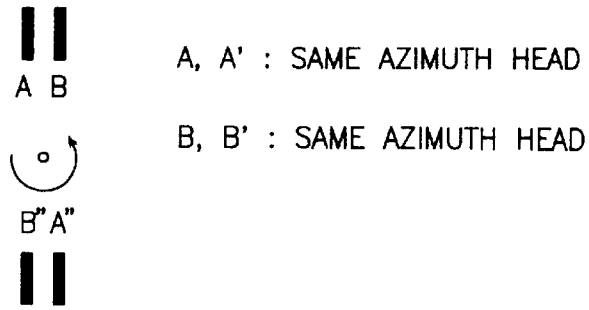
FIG. 6 is a table of a basic list of a VCR for a digital HDTV according to the present invention.
FIG. 7 is a view of a 2×2 CH head adopted in the present invention.
FIG. 9 is a table of a synchronous block number reproduced in each speed type according to the present invention.

Here, a basic specification of a home type digital VCR as shown in FIG. 6 can be adopted in the present invention. Since 48 syncblocks of 352 syncblocks per track can be allocated for the trick region, the speed change reproduction data is directed to using a rate of about 3.93 Mbps. As shown in FIG. 7, 2×2 CH head can be adopted in the present invention. Here, it is noted that A, A' and B, B' are the same azimuth head.

The present invention is not limited to the use of an azimuth recording method; that is, it can be adopted to other recording format. However, here the operation thereof will now be explained with a basis of the azimuth recording method.

Figure 8A:
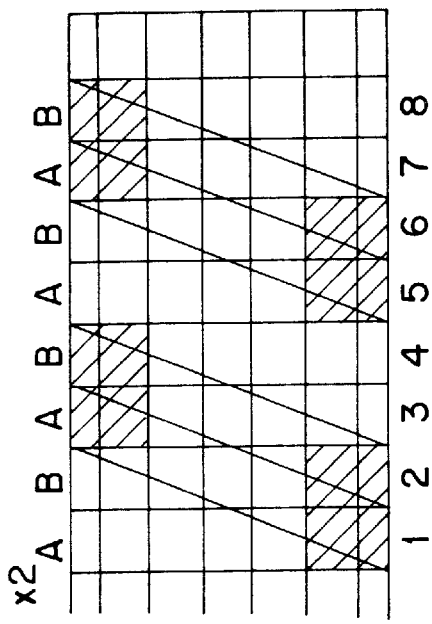
FIG. 8A is a view of a 2 speed reproduction region according to the present invention.
Figure 8B:
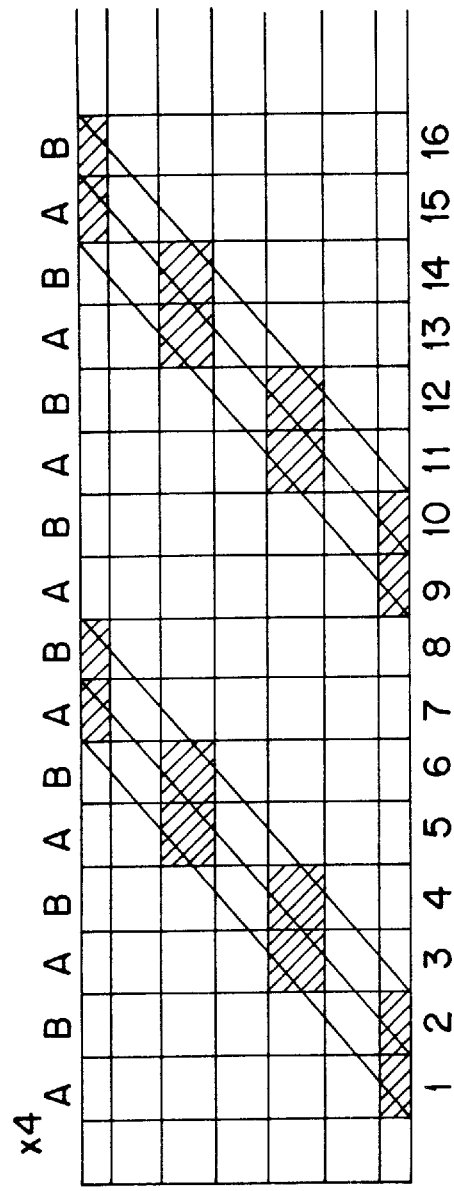
FIG. 8B is a view of a 4 speed reproduction region according to the present invention.
Figure 8C:
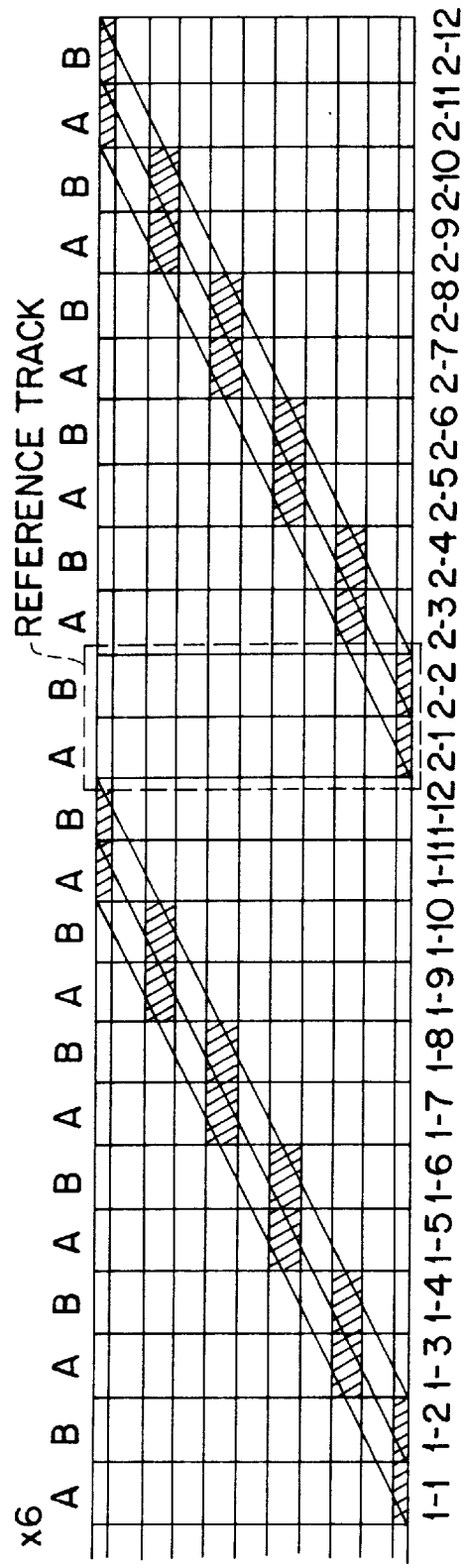
FIG. 8C is a view of a 6 speed reproduction region according to the present invention.

FIGS. 8A through 8C show traces of a head of 2 speed, 4 speed, and 6 speed, respectively. In addition, in these drawings, the hatched portions denote a reproducible region. Here, a maximum effective track difference for detecting data is 50% of a track pitch.

A minimum reproduction region (MRA) reproducible from each track at "N" speed can be expressed as follows.

$$\text{Reproduction region} = \frac{L}{4 \times (N-1)},$$

where L is the number of syncblocks per track, and N is the speed. Therefore, the number of the syncblock per track is 352, and the syncblock number reproduced per track at a certain speed of a system of 2×2 CH can be computed by the expression above.

The method of positioning a trick region on a track of a tape is as follows in an assumption that the speed is 2 speed, 4 speed and 6 speed, and 2×2 CH head and 353 SBS per track.

The running speed of the tape at 2 speed, 4 speed, and 6 speed is an integer times, and the head driving clock is controlled by a phase locking, and the head tracking is synchronized by an azimuth. Therefore, since the reproducing data position is determined in accordance with each speed, the data recorded on its corresponding region can be reproduced. Therefore, when separating the positions to its trick region, the speed change data with respect to a certain speed can be detected and reproduced.

However, since a head does not run with respect to a trick region with respect to a certain speed, and since the data detection of the recorded data can not be executed, the trick region should be set within a reproducible region at a certain speed.

Figure 8D:
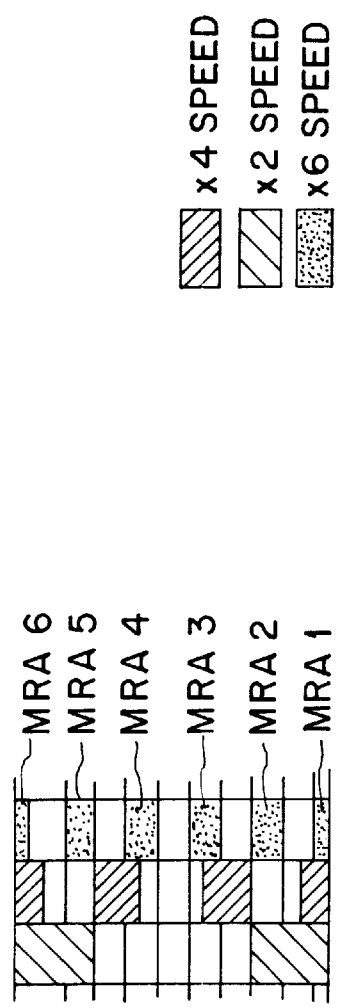
FIG. 8D is a view of a reproduction region within a track of 2 speed, 4 speed, and 6 speed reproductions according to the present invention.
Figures 10, 11:
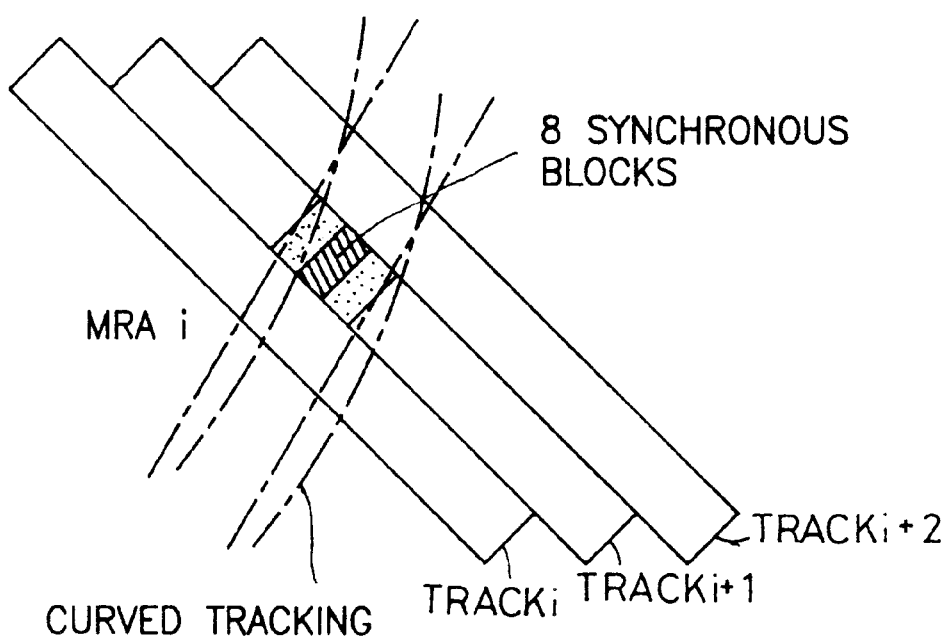
FIG. 10 is a table of a synchronous block number reproduced in 2 speed, 4 speed and 6 speed reproductions according to the present invention.
FIG. 11 is a view of a speed change reproduction data recording position with respect to a curved tracking according to the present invention.

When a head starts to track on a predetermined track at 2 speed, 4 speed or 6 speed, the positions of the synchronous block in which a certain data is always reproducible are shown in FIG. 8D. These positions can be expressed as certain numbers as shown in FIG. 10.

When a duplicating region with respect to three speed types in a reproduction region is allocated from the trick region, a speed change reproduction data with respect to the speed types above is detected. Therefore, when assuming that a maximum speed is 6 speed, the minimum reproduction region (MRA) is about 18 synchronous blocks, and when starting a tracking at a certain position, the number of the minimum reproduction region (MRA) crossing one track is 6.

For example, when reproducing about a reference track at a 6 speed, the minimum reproduction region MRA1 is a region in which a head "A" starts tracking at a position "2-1", and the minimum reproduction region MRA2 is a region in which a head "A" starts tracking at a position "1-11", and the minimum reproduction region MRA3, the minimum reproduction region MRA4, the minimum reproduction region MRA5, and the minimum reproduction region MRA6 are positions "1-9", "1-7", "1-5" and "1-3", respectively.

Therefore, by double-recording the speed change reproduction data at MRAi (i=1, 2 . . . 6) of each track, it is possible to reproduce the speed change reproduction data even though a tracking for a certain speed reproduction at a predetermined track position starts. In addition, a plurality of speed reproductions are possible because the minimum reproduction region MRAi are reproducible regions with respect to 2 speed, 4 speed, and 6 speed.

Figure 12:
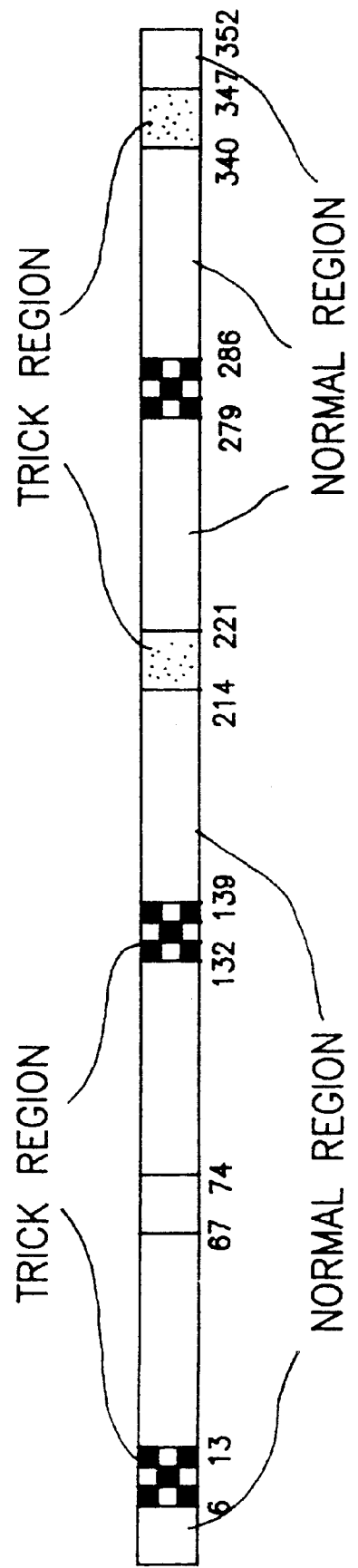
FIG. 12 is a view of a track-by trick region and a normal region according to the present invention.

Since the speed change reproduction region per track is a synchronous block, 8 synchronous blocks are recorded on the minimum reproduction regions MRAi of one track as a speed change reproduction data. At this time, since the 8 synchronous blocks of each MRAi are allocated to a more stable tracking region, the speed change reproduction data can be normally reproduced even though the head tracks in a curved method at a certain speed. That is, FIG. 11 shows a speed change reproduction data record position with respect to a curved portion of the tracking, and the 8 synchronous blocks of the speed change reproduction data are positioned at the center of the minimum reproduction regions MRAi (i=1, 2 . . . , 6). FIG. 12 shows a trick region under the conditions above.

The operation of a recording apparatus for a VCR speed change reproduction for a digital HDTV according to the present invention will now be explained.

To begin with, the error correction coder 111 adds a redundancy bit such as a parity bit to an HDTV bit stream so as to resolve the problems which occurs during a recording and reproducing process, and the normal interleaver 112 executes an interleaving so as to resolve the burst problems which occurs due to a head/tape mechanism, and the synchronous signal Sync and the identification signal ID are added to the thusly interleaved bit stream by the syncblock generator 113, and the syncblock is generated, and the thusly generated syncblock is stored in the buffer 114 provided for storing the normal reproduction bit stream. At this time, the data interleaved by the normal interleaver 112 is a data for a normal reproduction bit stream, and the format for the interleaving is different from the format of the interleaving with respect to the speed change reproduction bit stream.

Figures 13, 14:
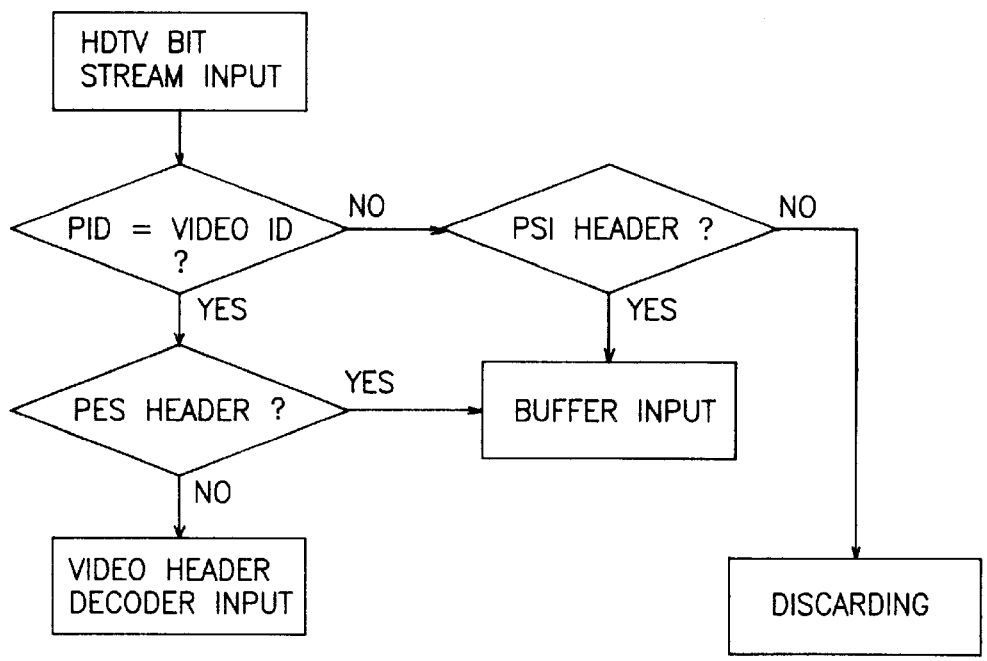
FIG. 13 is a flow chart of a video bit stream separated from a system recorder of FIG. 13 according to the present invention.
FIG. 14 is a view of a picture code type adopted in a video header decoder of FIG. 5 according to the present invention.

Meanwhile, as shown in FIG. 13, the transport decoder 121 receives an HDTV bit stream transmitted thereto in a transport packet form and recognizes the PID header of a link layer contained in the transport packet, and the PID header judges the video ID. Thereafter, the header information PSI PES which are necessary for the encoding are stored in the buffer 122, and the video bit stream is applied to the video header decoder 123.

Next, the operation of the video bit stream processing unit 130 which extracts a speed change reproduction bit stream recorded on the real tape from the video bit stream separated by the transport decoder 121 and reformats the thusly extracted bit stream into a recording format will now be explained.

The video header decoder 131 extracts an intraframe bit stream from the video bit stream outputted from the transport decoder 121 using a video syntax, and the group of picture (GOP) utilizes a picture coding type (PCT), shown in FIG. 14, contained in the picture header with respect to the variable bit stream and separates the intraframe coded bit stream.

Figure 15:
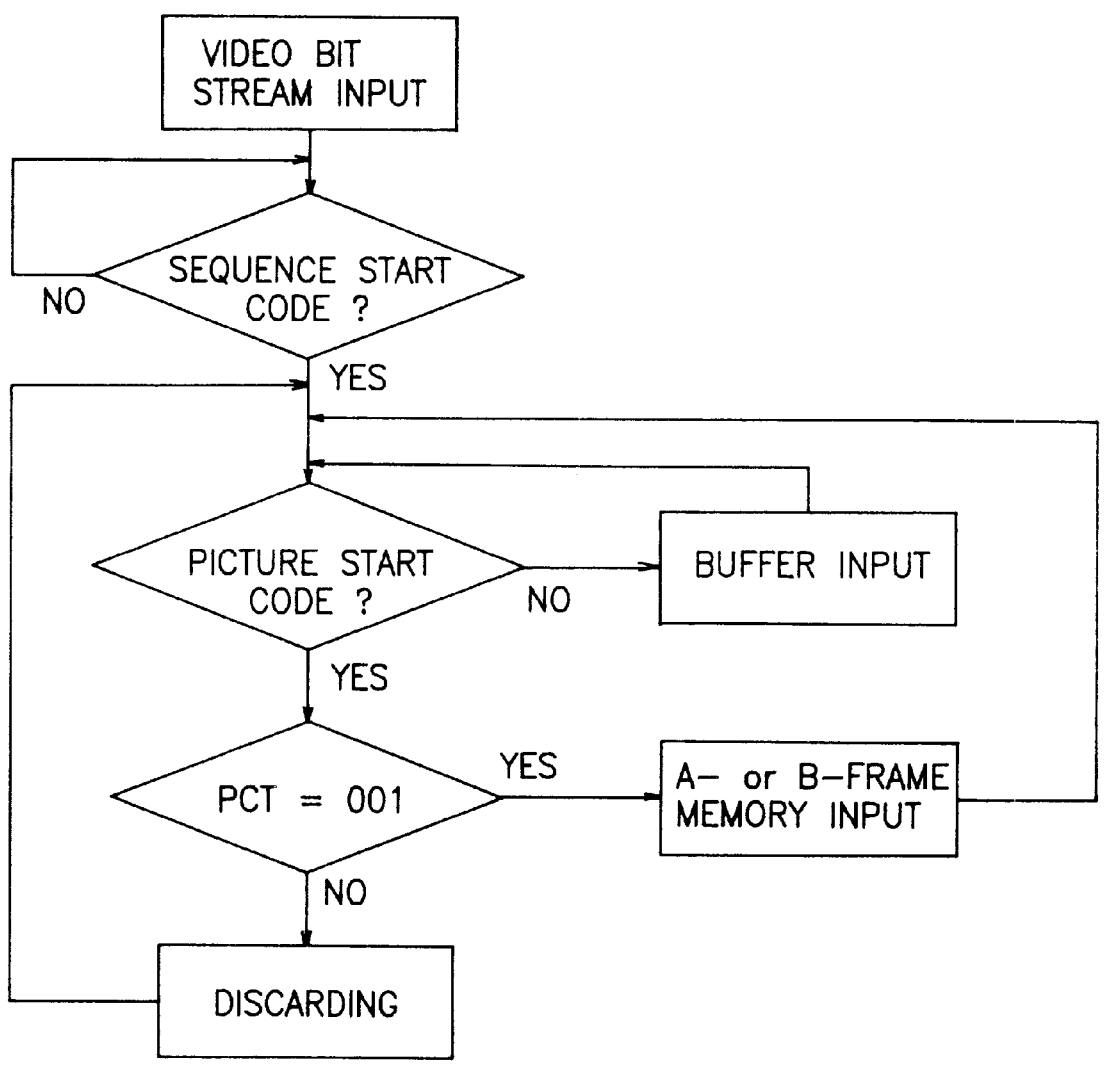
FIG. 15 is a flow chart of a bit stream of an intraframe separated from a video header decoder of FIG. 5 according to the present invention.

That is, as shown in FIG. 15, in case that the GOP is variable, the GOP header is stored in the buffer 132 when the sequence start code is not a picture start code, and when the picture coding type is "001", since the bit stream is an intraframe code, the bit stream is stored in either the A-frame memory 133A or the B-frame memory 133B.

However, with respect to the bit stream in case that the GOP is fixed as "N", since the interframe is periodically presented, it is possible to separate the intraframe bit stream by counting after recognizing the picture start code. For example, in case that the GOP is 15, there exists an intraframe in every 15 frames.

Figure 16:
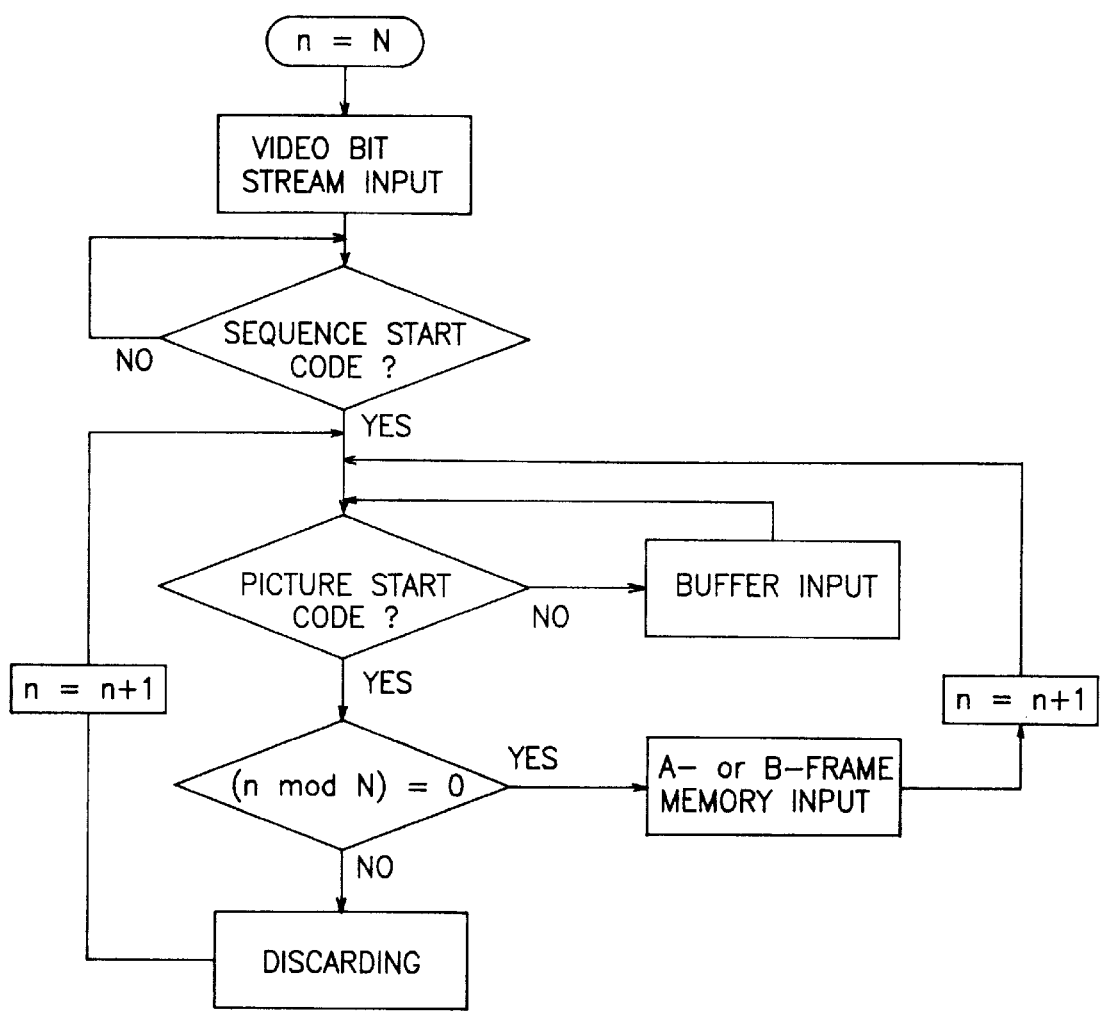
FIG. 16 is a flow chart of a bit stream of an intraframe separated from a video header decoder of FIG. 5 when the number of COPs is constant according to the present invention.

That is, referring to FIG. 16, a sequence start code is detected in a video bit stream, and when the thusly detected sequence start code is not the picture start code, the GOP header is stored in the buffer 132 for use in the transport encoder 141. In addition, when the sequence start code is a picture start code, the bit stream of a picture corresponding to the N-times is an intraframe, the bit stream of the picture is stored in either the A-frame memory 133A or the B-frame memory 133B. That is, the sequence information and the GOP header information of the video bit streams are stored in the buffer 132 and applied to the speed change reproduction video bit stream generator 139 for generating the speed change video bit stream.

Here, in order to prevent the overflow, the A-frame memory 133A and the B-frame memory 133B each have a construction capable of storing the maximum data generated when video information is coded to an intraframe. When the video stream is inputted into the A-frame memory 133A from the video header decoder 131, since the video bit stream outputted from the B-frame memory 133B is applied to the variable length decoder 134, the A-frame memory 133A and the B-frame memory 133B can correspond to the variably generated bit amount and timing of the intraframe, and a desired buffer function of the variable length decoder 134 can be achieved.

Since the HDTV bit stream is variable-length-coded so as to achieve a higher compression rate, the variable length decoder 134 decodes the intraframe bit stream in a variable length method outputted from either the A-frame memory 133A or the B-frame memory 133B so as to recognize each codeword of the video bit stream.

In addition, the picture header of the intraframe coder bit stream of the output information of the variable length decoder 134 is stored in the buffer 135A, and the slice header, the coding information of the macroblock are stored in the buffer 135B and inputted into the speed change reproduction video bit stream generator 139 in accordance with a proper timing.

Since the surface of the trick region on the tape is limited, the run length codeword selector 136 extracts a direct current component and a low frequency component which are the major data of codeword of each block, that is, which is a certain component playing a key role in implementing a speed change picture of the DCT coefficients contained in each intraframe. However, since the HDTV bit stream is variable-length coded, the run length codeword selector 136 cannot extract a certain number of the DCT coefficients, and extracts some run length codeword. In addition, the bit amount of the data extracted is not determined by a DCT coefficient but by the number of the run length codeword.

At this time, the number of the direct current component and run length codeword to be extracted at each block is determined by the number of the run length codeword outputted from the bit rate controller 142 so as to control the bit amount.

The end of block (EOB) input unit 137 adds the EOB code, for example, code 10 or code 0110, behind the direct current component and run length codeword so as to meet a video syntax with respect to each block.

The byte alignment unit controls the speed change reproduction data so that each start code is positioned at a byte boundary on the video syntax of the HDTV bit stream. That is, the HDTV bit stream inputted thereto is a byte alignment type; however, in case of the bit stream extracted as a speed change reproduction data, since it is different from the construction of the HDTV bit stream inputted thereto, a new byte alignment is necessary.

Figure 17:
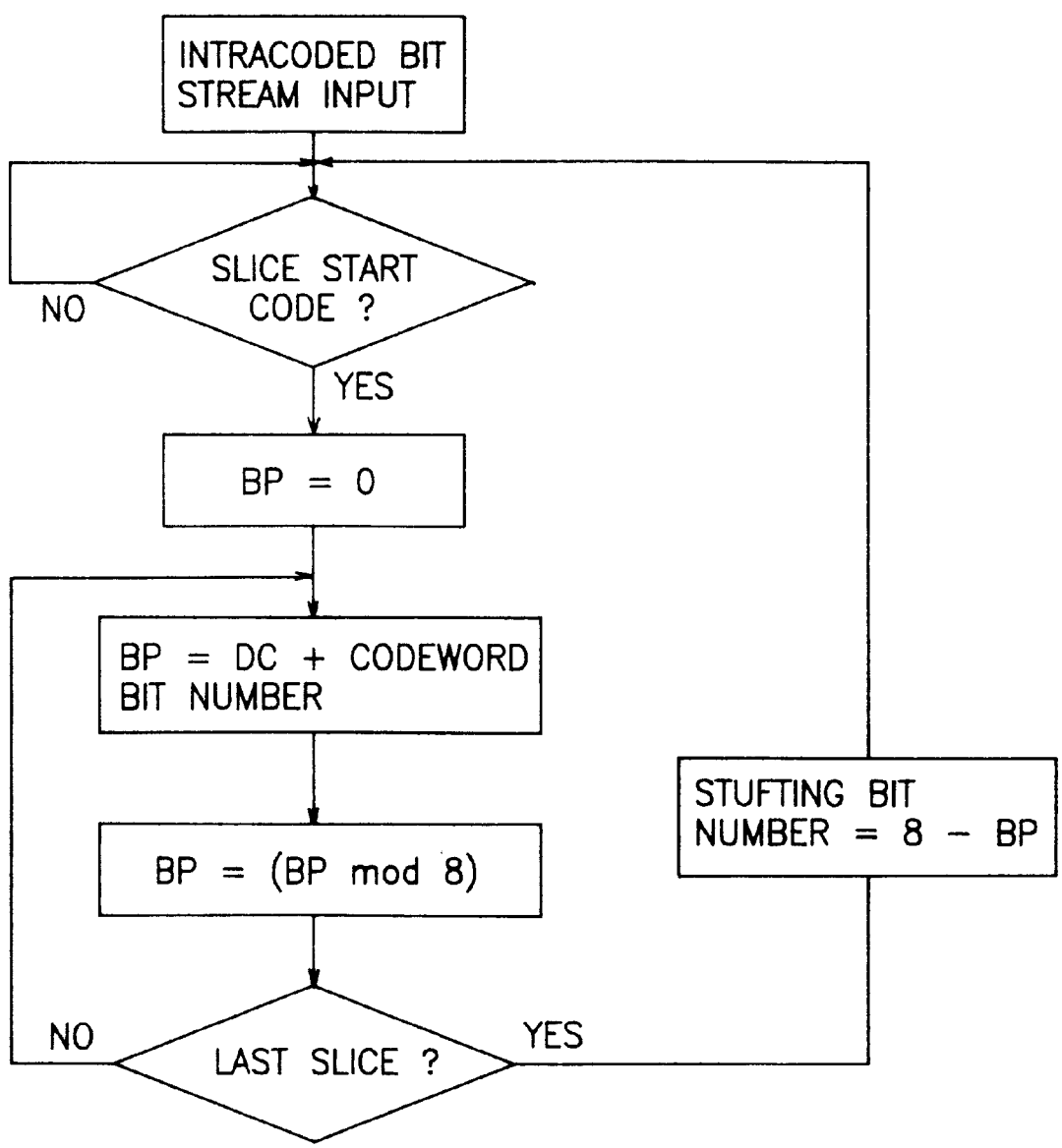
FIG. 17 is a flow chart of a byte alignment of a byte alignment unit of FIG. 5 according to the present invention.
Figure 18:
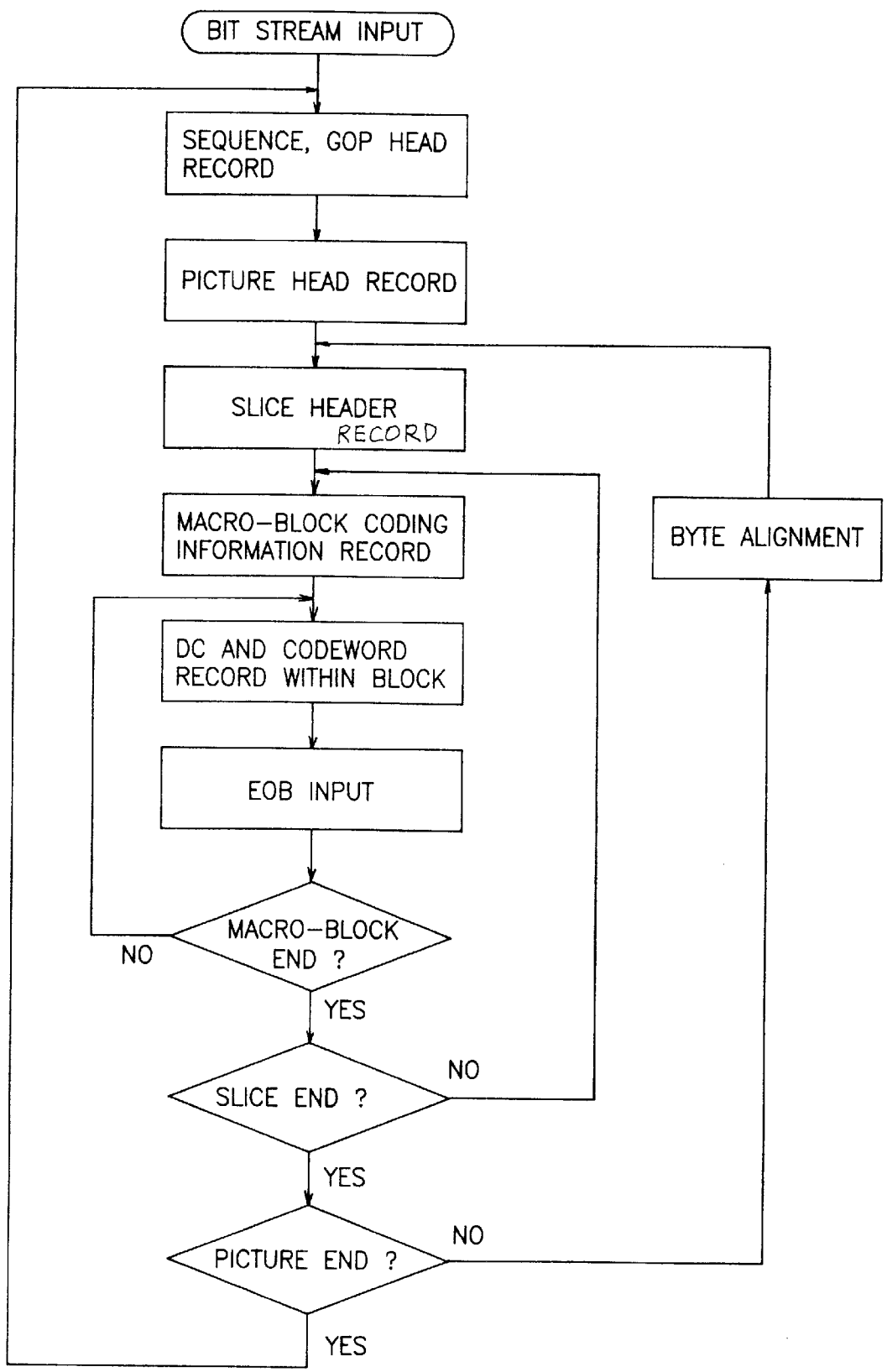
FIG. 18 is a flow chart of a speed change reproduction bit stream formation of a video bit stream of FIG. 5 according to the present invention.

Therefore, as shown in FIG. 17, the byte alignment unit 138 recognizes a slice start code and extracts an intraslice speed change reproduction data, and the byte point BP is updated in every bit of the direct current component of the 8 bits and the run length codeword, and "0" bit is added so that the slice start code is positioned at the byte boundary.

Thereafter, the video bit stream generator 139, as shown in FIG. 20, reformats the header information outputted from the buffers 132, 135A, and 135B and the speed change reproduction video bit stream outputted from the run length codeword selector 136 in accordance with a control of the EOB input unit 137 and the byte alignment 138.

At this time, the sequence header, the GOP header outputted from the buffer 132 are positioned at the frontmost portion of the speed change reproduction frame. That is, the sequence information and the GOP header information are presented at the HDTV bit stream; however, a user can start a speed change reproduction mode at any position, and since the sequence header to the starting point of the speed change reproduction does not have any relationship with the speed change reproduction data to be reproduced, the sequence information and the GOP header information are inputted into each frame in the speed change reproduction bit stream.

In addition, since the HDTV video decoder generally resets the information in the then buffer and the then register when the speed change bit stream is inputted, it is preferable to input the sequence header into each frame so as to initialize a decoding parameter.

Thereafter, the transport encoder 141 reformats the speed change reproduction video bit stream extracted from the speed change reproduction video bit stream generator 139 into a transport packet which is a transmission standard using the PSI and PES head information outputted from the buffer 122, and a trick mode flag is set as "1" so as to indicate that the bit stream inputted to the HDTV video decoder is a speed change reproduction bit stream.

However, since a trick region is fixed to a certain frame for the speed change picture, for example, at about 576 kbps, the amount of the speed change reproduction bit stream should be within the range thereof. Therefore, the bit rate controller 142 controls the bit amount extracted as the speed change reproduction data by controlling the number of the run length codeword which is selected by each block. That is, when one frame includes M slices, and the bit rate is controlled by an N slice unit, and in case that the track region allocated to one frame is L, it is desirable to obtain the bit number of (L×N/M) in an average from the N slices.

Therefore, when the bit amount generated by every N slices is more than an average of the bit amount, the number of the run length codeword is decreased, and the bit amount generated by every N slices is less than an average of the bit amount, the number of the run length codeword is increased. When underflow occurs, the bit amount is controlled using a null packet of the stuffing unit 143.

Thereafter, the error correction coder 151 receives a video bit stream, which is reformatted to a transport packet, outputted from the transport encoder 141, and adds a redundancy bit for correcting error to the bit stream. The trick interleaver 152 executes an interleaving so as to overcome a burst error, and the syncblock generator 153 executes a syncblock with respect to the bit stream inputted thereto and stores the synchronized block bit stream into the A-frame buffer 154A and the B-frame buffer 154B through a switch 154 so that the synchronized block bit stream is selected as a proper timing with respect to the normal reproduction bit stream.

The multiplexer 161, as shown in FIG. 19, selects a speed change bit stream VBB outputted from either a normal reproduction bit stream NB outputted from the normal reproduction bit stream processing unit 110, or a speed change reproduction bit stream VBA outputted from the A-frame buffer 154A, or a speed change reproduction bit stream VBB outputted from the B-frame buffer 154B in accordance with timing signals NORMAL, TRICKA, and TRICKB outputted from the track recording format unit 162.

That is, the trick region and the normal region per track is allocated as shown in FIG. 20A, the track recording format unit 162 applies a timing signal NORMAL as shown in FIG. 20C to the multiplexer 161 so as to select a normal reproduction bit stream NB, applies a timing signal TRIKA as shown in FIG. 20D to the multiplexer 161 so as to select a speed change bit stream VBA, and applies a timing signal TRICKB as shown in FIG. 20E to the multiplexer 161 so as to select a speed change bit stream VBB, so that the bit stream outputted from the multiplexer 161 is recorded on the tape through a modulator (not shown).

The above-mentioned operation will be explained in more detail with reference to FIGS. 21 and 22.

Figure 21:
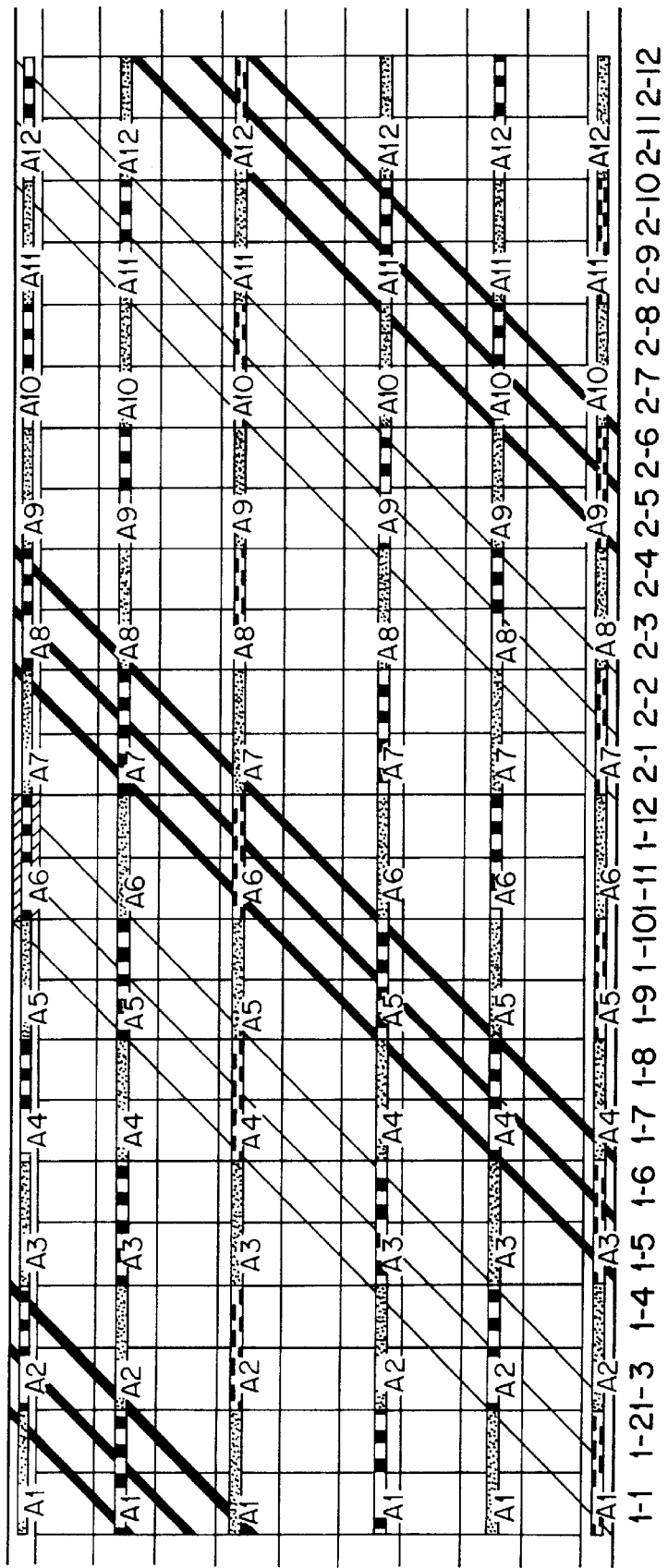
FIG. 21 is a view of a format that a data is recorded on an Ai-trick region of a tape according to the present invention.

To begin with, as shown in FIG. 21, when a speed change reproduction data is double-recorded, and when the head rotates one time, since all of A1-A2-A3 ... A16 are reproduced in case that a tracking starts at a position 1-1 in a 6 speed type and in case that a tracking starts at a position 1-5, a certain speed starts at a predetermined position, all the trick regions can be reproduced.

Here, since the same Ai of the track reproduced at a 4 speed and a 2 speed are the double recorded data, one Ai of the detected Ai is used.

Therefore, at a low speed, the resolution cannot be increased because the speed picture is executed as A1-A2-A3-A4 ... An as with respect to a 6 speed, a 4 speed and a 2 speed.

In order to resolve the above problems, the present invention includes the two memory type of the A-frame buffer 154A and the B-frame buffer 154B for storing the speed change reproduction data and uses a proper multiplexing time.

Figure 22:
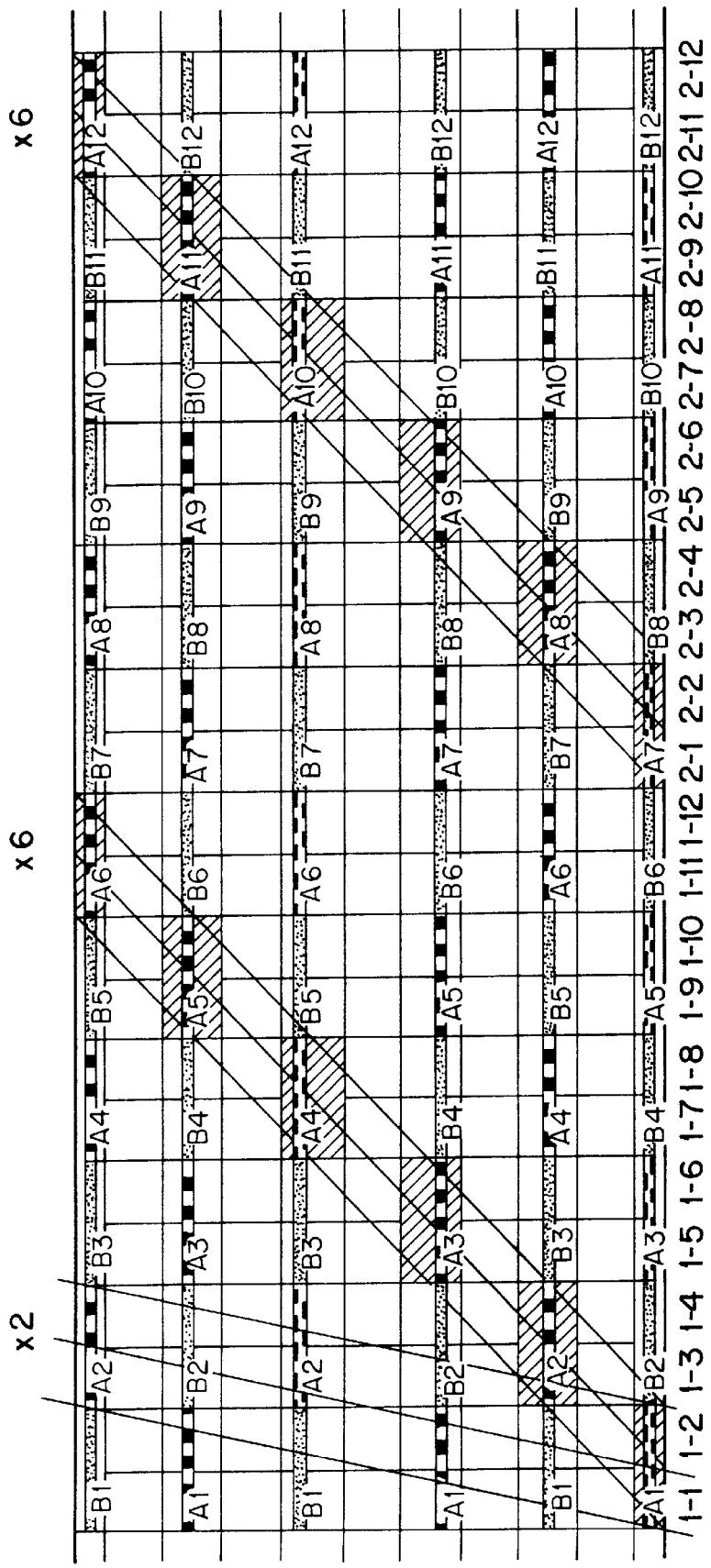
FIG. 22 is a view of a format that a data is recorded on an Ai/Bi trick region of a tape according to the present invention.

That is, the speed change reproduction data is double-recorded on each track as shown in FIG. 22 so as to increase the resolution at a low speed. Here, the MRA corresponding to Ai (i=1, 2, 3, ... ,N) is a region that a speed change reproduction data is double-recorded on the A-frame buffer 154A, and the MRA corresponding to Bi (i=1, 2, 3, ... N) is a region that a speed change reproduction data is double-recorded on the B-frame buffer 154B. That is, the speed change reproduction data outputted from the A-frame buffer 154A and the B-frame buffer 154B is alternately double-recorded on the MRA of each track.

Therefore, "A1-A2-A3- ... An" is sequentially reproduced in accordance with a position that a speed change starts at a 6 speed so as to form a speed change picture with respect to an A-frame, and "B1-B2-B3- ... Bn" is sequentially reproduced so as to form a speed change picture with respect to a B-frame. However, since the region capable of reproducing per track at a 2 speed is larger, the A-frame speed change reproduction data and the B-frame speed change reproduction data such as "A1-B1-A2-B2-A3-B3- ... -An-Bn" are detected at the same time so as to form the speed change pictures of the A- and B-frames.

Therefore, compared with FIG. 21, since the number of the speed change picture is increased at a low speed, the resolution is increased.

When assuming that the bit number used so as to form one frame is 576 kbps, when the speed change reproduction data is recorded by 8 syncblocks per track, a speed change reproduction data extracted from the bit stream, of the intraframe is recorded on about 120 tracks. Here, the speed change reproduction data includes a direct current component, 2 or 3 low frequency coefficients and a header information.

Therefore, the synchronous block number reproduced during one rotation of the head at a 6 speed is 192 (8 synchronous blocks×6×2×2), and the synchronous block number detected per second is 5760 (30×192). Therefore, since the speed change reproduction data per frame is about 960 syncblocks (about 576 kbps), a speed change picture of 6 frames per second is necessary. In addition, since the speed change of 4 frames per second at a 4 speed and 2 frames per second at a 2 speed are necessary, the lower the speed, the better the resolution of the speed change picture.

As described above, the speed change reproduction recording apparatus for a VCR of a digital HDTV and a method thereof according to the present invention can achieve a better resolution at a low speed. In addition, it is possible to achieve a speed change start at a predetermined position. Moreover, an additional tracking algorithm is not necessary, and a speed change picture with respect to a plurality of speed types can be formed. In addition, a more stable speed change data can be detected with respect to a curved tracking which occurs at a head/tape mechanism.

What is claimed is:

1. An apparatus for method of recording digital video data, the apparatus comprising:

receiving means for receiving said digital video data;

generator means for generating fast playback data for at least a first frame and a second frame based upon said digital video data; and recording means for recording said fast playback data in tracks of a recording medium such that said fast playback data for said first frame and said fast playback data for said second frame are each recorded at least twice in a same one of said tracks.

2. The apparatus as in claim 1, wherein:

said receiving means includes a normal reproduction bit stream processing unit for converting an HDTV bit stream into a VCR recording format and for outputting a normal reproduction bit stream;

said generator means includes
  a system decoder for separating a video bit stream from a transmission layer of said HDTV bit stream,
  a video stream processing unit for extracting speed change reproduction data from a video bit stream separated by said system decoder and for converting the extracted speed change reproduction data into a format of a video syntax, and
  a system encoder for reformatting speed change reproduction data outputted from said video bit stream processing unit into a transport packet in accordance with a header information outputted from said system decoder; and said recording means includes
  a recording format processing unit for converting speed change reproduction data outputted from said system encoder to a VCR recording format and for storing the thusly converted speed change reproduction data into a corresponding one of a plurality of frame buffers, and
  a track recording format unit for selecting normal reproduction data outputted from said normal reproduction bit stream processing unit and speed change reproduction data outputted from said recording format processing unit in accordance with a predetermined timing.

3. The apparatus of claim 2, wherein said system decoder includes:

a transport decoder for recognizing a packet identification data contained in an HDTV bit stream, and for separating a video bit stream, and for extracting a system header information from said HDTV bit stream; and a buffer for temporarily storing a header information outputted from said transport decoder.

4. The apparatus of claim 2, wherein said video bit stream processing unit includes:

a video header decoder for extracting an intraframe bit stream from a video bit stream outputted from the system decoder;

a second buffer for storing either a sequence head information or a group of picture header information outputted from said video header decoder;

an A-frame memory and a B-frame memory each for storing an intraframe bit stream outputted from the video header decoder;

a variable length decoder for decoding a bit stream outputted from either said A-frame memory or said B-frame memory in a variable length method;

a third buffer for storing a picture header information decoded by said variable length decoder;

a fourth buffer for storing a slice header information and a macro block decoded by the variable length decoder;

a run length codeword detector for selecting a certain data which is important for a construction of a speed change picture from a codeword of each block contained in a bit stream decoded by the variable length decoder in accordance with the number of said run length codeword;

an end of block input unit for adding an end of block code into a speed change bit stream outputted from said run length codeword selector;

a byte alignment unit for aligning each byte to have the same bit alignment of an HDTV of the speed change reproduction bit stream outputted from the run length codeword selector; and a speed change reproduction bit stream generator for reformatting a bit stream outputted from the run length codeword selector into a format of a syntax of an HDTV video bit stream using a header information stored in said second, third, and fourth buffers.

5. The apparatus of claim 4, wherein said video header decoder stores a header information into a buffer by comparing a sequence start code and picture start code, extracts and intraframe using a picture coding type signal, and stores the thusly extracted intraframe into either the A-frame memory or the B-frame memory so as to extract a bit stream of an intraframe from a video bit stream inputted thereto.

6. The apparatus of claim 4, wherein said video header decoder stores a header information into a buffer by comparing a sequence start code and a picture start code, extracts an intraframe by comparing the number of frames counted for a previously set cycle in which an intraframe generates, and stored the thusly extracted into either the A-frame memory or the B-frame memory so as to extract a bit stream of an intraframe from a video bit stream inputted thereto.

7. The apparatus of claim 4, wherein said byte alignment stores a header information into a buffer by identifying a slice start code and stuffs a bit as much as of [8-{(bit number of codeword selected by run length codeword selector+bit number of direct current component) mod 8}] so as to extract a speed change bit stream from a bit stream of an intraframe inputted thereto.

8. The apparatus of claim 2, wherein said system encoder includes:

a bit rate controller having a previously set codeword for controlling a bit rate of a data outputted from the video bit stream processing unit so that a speed change data can be extracted to correspond to a region which is allocated for a speed change data;

a stuffing unit for adding a null packet in case that a data is less than that of the number of bits allocated thereto in accordance with a control of said bit rate controller; and a transport encoder for reformatting a speed change reproduction data outputted from the video bit stream processing unit to a transport packet which is a transmission standard using a header information outputted from the system decoder.

9. The apparatus of claim 2, wherein said recording format processing unit includes:

an error correction coder for inputting a redundancy bit into a bit stream outputted from the transport encoder for an error correction;

a trick interleaver for executing an interleaving with respect to an output bit stream of said error correction coder;

a synchronous block generator for converting an output bit stream of said trick interleaver into a format of a syncblock; and an A-frame buffer and a B-frame buffer each for storing a speed change picture by one frame applied from said synchronous block generator.

10. The apparatus of claim 2, wherein said track recording format unit includes:

a recording generator for receiving a head switching signal of a rotation control signal of a drum and for outputting a multiplexing timing signal, a normal timing signal, a trick A-timing signal, and a trick B-timing signal; and a multiplexer for receiving normal reproduction data, a speed change data of a frame outputted from said one of a plurality of frame buffers of said recording format processing unit and for multiplexing an input data in accordance with a control of a timing signal outputted from the recording time generator.

11. The apparatus of claim 1, wherein said recording means is operable to record said fast playback data for said first frame at least twice in each track of a set of at least two tracks and said fast playback data for said second frame at least twice in each track of said set of at least two tracks.

12. The apparatus of claim 11, wherein said fast playback data corresponds to a fast speed of ×2, ×4 and ×6 such that said set of tracks has two tracks, four tracks and six tracks, respectively.

13. A method of recording digital video data, the method comprising the steps of:

receiving said digital video data;

generating fast playback data for at least a first frame and a second frame based upon said digital video data; and recording said fast playback data in tracks of a recording medium such that said fast playback data for said first frame and said fast playback data for said second frame are each recorded at least twice in a same one of said tracks.

14. The method of claim 13, wherein:

said step of generating includes allocating an M-portion in which a certain data is always reproducible to a trick region when a speed change reproduction starts on a certain track in accordance with a maximum speed of a certain speed such as "×N" where N is 2, 4, 6, . . . N, and setting a minimum region of said trick region as a basic unit of a trick region to be allocated on one track; and said step of recording includes doubly recording the thusly extracted speed change reproduction data on a trick region of an M-portion existing in one track.

15. The method as in claim 13, wherein:

said step of generating includes allocating an M-portion in which a certain data is always reproducible to a trick region when a speed change reproduction starts on a certain track in accordance with a maximum speed of a certain speed such as "n X" where N is 2, 4, 6 . . . N , and setting a minimum region of said trick region as a basic unit of a trick region to be allocated on one track; and said step of recording includes doubly recording a speed change reproduction data of an A-frame or a speed change reproduction data of a B-frame on one track wherein a speed change data of said A-frame and a speed change data of a B-frame on one track wherein a speed change data of said A-frame and a speed change data of a B-frame are allocated to a trick region of M/2 portion of an M-portion.

16. The method of claim 12, wherein said step of recording records said fast playback data for said first frame at least twice in each track of a set of at least two tracks and said fast playback data for said second frame at least twice in each track of said set of at least two tracks.

17. The method of claim 16, wherein said fast playback data corresponds to a fast speed of ×2, ×4 and ×6 such that said set of tracks has two tracks, four tracks and six tracks, respectively.

18. A method of recording digital video data, the method comprising the steps of:

receiving said digital video data;

generating fast playback data for at least a first frame and a second frame based upon said digital video data; and recording said fast playback data in tracks of a recording medium such that said fast playback data for said first frame is recorded in each track of a set of at least two tracks and such that said fast playback data for said second frame is recorded in each track of said set of at least two tracks.

19. The method of claim 18, wherein said fast playback data corresponds to a fast speed of ×2, ×4 and ×6 such that said set of tracks has two tracks, four tracks and six tracks, respectively.

20. An apparatus for recording digital video data, the apparatus comprising:

receiving means for receiving said digital video data;

generating means for generating fast playback data for at least a first frame and a second frame based upon said digital video data; and recording means for recording said fast playback data in tracks of a recording medium such that said fast playback data for said first frame is recorded in each track of a set of at least two tracks and such that said fast playback data for said second frame is recorded in each track of said set of at least two tracks.

21. The method of claim 20, wherein said fast playback data corresponds to a fast speed of ×2, ×4 and ×6 such that said set of tracks has two tracks, four tracks and six tracks, respectively.

* * * * *